US012743083B2

(12) United States Patent
Zhang et al.

(10) Patent No.: US 12,743,083 B2
(45) Date of Patent: Sep. 22, 2026

(54) OBSTACLE RECOGNITION INFORMATION FEEDBACK METHOD AND APPARATUS, ROBOT, AND STORAGE MEDIUM

(71) Applicant: Beijing Roborock Innovation Technology Co., Ltd., Beijing (CN)

(72) Inventors: Lei Zhang, Beijing (CN); Jianwen Liu, Beijing (CN); Erqi Wu, Beijing (CN)

(73) Assignee: BEIJING ROBOROCK INNOVATION TECHNOLOGY CO., LTD., Beijing (CN)

( * ) Notice: Subject to any disclaimer, the term of this patent is extended or adjusted under 35 U.S.C. 154(b) by 185 days.

(21) Appl. No.: 18/249,069

(22) PCT Filed: Jun. 17, 2021

(86) PCT No.: PCT/CN2021/100732
§ 371 (c)(1),
(2) Date: Apr. 14, 2023

(87) PCT Pub. No.: WO2022/077945
PCT Pub. Date: Apr. 21, 2022

(65) Prior Publication Data

US 2023/0393583 A1 Dec. 7, 2023

(30) Foreign Application Priority Data

Oct. 14, 2020 (CN) ........................ 202011098286.3

(51) Int. Cl.
*G05D 1/00* (2024.01)

(52) U.S. Cl.
CPC ......... *G05D 1/0238* (2013.01); *G05D 1/0016* (2013.01); *G05D 1/0246* (2013.01)

(58) Field of Classification Search
CPC .... G05D 1/0238; G05D 1/0016; G05D 1/622; G05D 2109/10; G05D 1/2297; G06V 20/10; A47L 9/00; A47L 2201/04
See application file for complete search history.

(56) References Cited

U.S. PATENT DOCUMENTS 9,744,671 B2 * 8/2017 Connell, II ............ G06V 20/10
2010/0241693 A1 * 9/2010 Ando ..................... G06Q 30/06 901/1

(Continued)

FOREIGN PATENT DOCUMENTS

CN 101986673 A 3/2011
CN 103324937 A 9/2013

(Continued)

OTHER PUBLICATIONS

Allowance from Chinese Application No. 202011098286.3 dated Nov. 15, 2023.

(Continued)

*Primary Examiner* — Wade Miles
*Assistant Examiner* — Mohammed Yousef Abuelhawa
(74) *Attorney, Agent, or Firm* — Calfee, Halter & Griswold LLP

(57) ABSTRACT

Provided are an obstacle detection method and apparatus, an autonomous robot, and a storage medium. The obstacle detection method includes: upon reception of a triggered feedback instruction, providing an interactive interface to allow a user to submit feedback information, the feedback information including a related picture and type information of an obstacle contained in the picture; and after learning that submission by the user is completed, sending the feedback information to a server or notifying a bound autonomous robot to send the feedback information to the server.

17 Claims, 5 Drawing Sheets

(56) References Cited

U.S. PATENT DOCUMENTS

| | | | | |
|---|---|---|---|---|
| 2014/0123299 | A1* | 5/2014 | Jung | G06F 21/62 726/26 |
| 2016/0337599 | A1* | 11/2016 | Williams | G01C 21/28 |
| 2019/0213438 | A1* | 7/2019 | Jones | G06V 40/10 |
| 2019/0294954 | A1* | 9/2019 | Han | G06V 10/82 |
| 2019/0332119 | A1* | 10/2019 | Kim | G05D 1/0248 |
| 2021/0208594 | A1* | 7/2021 | Han | G05D 1/0219 |
| 2021/0311480 | A1* | 10/2021 | Yang | G05B 13/0265 |
| 2022/0104675 | A1* | 4/2022 | Schneider | A47L 11/4061 |

FOREIGN PATENT DOCUMENTS

| | | | |
|---|---|---|---|
| CN | 103605928 | A | 2/2014 |
| CN | 103869833 | A | 6/2014 |
| CN | 105300597 | A | 2/2016 |
| CN | 105957145 | A | 9/2016 |
| CN | 106200645 | A | 12/2016 |
| CN | 106707293 | A | 5/2017 |
| CN | 106708084 | A | 5/2017 |
| CN | 108227738 | A | 6/2018 |
| CN | 108416257 | A | 8/2018 |
| CN | 108780319 | A | 11/2018 |
| CN | 109583384 | A | 4/2019 |
| CN | 109785298 | A | 5/2019 |
| CN | 110096059 | A | 8/2019 |
| CN | 110210521 | A | 9/2019 |
| CN | 110647152 | A | 1/2020 |
| CN | 110667474 | A | 1/2020 |
| CN | 110738303 | A | 1/2020 |
| CN | 110936370 | A | 3/2020 |
| CN | 110974088 | A | 4/2020 |
| CN | 111079586 | A | 4/2020 |
| CN | 111481105 | A | 8/2020 |
| CN | 112269379 | A | 1/2021 |
| JP | 2001260885 | A | 9/2001 |
| WO | 2019212174 | A1 | 11/2019 |
| WO | 2020107974 | A1 | 6/2020 |

OTHER PUBLICATIONS

International Search Report from PCT/CN2021/100732 dated Sep. 15, 2021.

Office action from Chinese Application No. 202011098286.3 dated May 25, 2022.

* cited by examiner

OBSTACLE RECOGNITION INFORMATION FEEDBACK METHOD AND APPARATUS, ROBOT, AND STORAGE MEDIUM

CROSS-REFERENCE TO RELATED APPLICATION

This application is a 35 U.S.C. 371 national phase application of PCT International Application No. PCT/CN2021/100732, which is filed on Jun. 17, 2021 and claims priority to Chinese Patent Application No. 202011098286.3 filed on Oct. 14, 2020, the disclosures of both are incorporated herein by reference in their entireties.

TECHNICAL FIELD

The present disclosure relates to the field of autonomous robot technologies, and more particularly to an obstacle recognition information feedback method and apparatus, a robot, and a storage medium.

BACKGROUND

With the development of the artificial intelligence technology, a variety of intelligent robots such as ground sweeping robots, ground mopping robots, vacuum cleaners and weeding machines, etc., have emerged. During operation, these cleaning robots can automatically recognize surrounding obstacles and perform obstacle avoidance operations for the obstacles. These cleaning robots not only liberate work force, save labor costs, but also improve the cleaning efficiency.

The existing ground sweeping robot containing a camera has an intelligent recognition function such as object recognition or scenario recognition based on a picture shot by the camera, and the intelligent determination function of the object or scenario is implemented based on a deep neural network model trained with a large amount of labeled data. Since the viewing angle of the ground sweeping robot is special, it is difficult to improve the intelligent determination ability from the viewing angle of the ground sweeping robot with the help of other existing picture libraries, and the obstacle recognition ability of the ground sweeping robot can be trained only with pictures from the viewing angle of the ground sweeping robot, but there is still cases of inaccurate recognition, false recognition and missed recognition of the object/scenario.

SUMMARY

An embodiment of the present disclosure provides an obstacle recognition information feedback method. The method is applied to a terminal, and includes: upon reception of a triggered feedback instruction, providing an interactive interface to allow a user to submit feedback information, the feedback information including a related picture and type information of an obstacle contained in the picture; and after learning that submission by the user is completed, sending the feedback information to a server, or notifying a bound autonomous robot to send the feedback information to the server.

Optionally, prior to the reception of the triggered feedback instruction, the following step is further included: receiving a viewing touch instruction from the user based on an obstacle type identification displayed in an application program interface, wherein the obstacle type identification is used to indicate a type of a pre-marked obstacle.

Optionally, the obstacle type identification includes an icon and/or a text description matching the type of the pre-marked obstacle.

Optionally, the sending the feedback information to the server, or the notifying the bound autonomous robot to send the feedback information to the server, includes: displaying a de-identified preview picture sent by the autonomous robot; and upon reception of a triggered upload instruction, sending the preview picture and the type information of the obstacle contained in the picture to the server, or notifying the bound autonomous robot to send the preview picture and the type information of the obstacle contained in the picture to the server.

Optionally, the following steps are further included: controlling the autonomous robot to perform shooting for the obstacle from at least one angle based on a shooting instruction issued by the user; displaying a picture shot this time; and providing the interactive interface to allow the user to submit feedback information, the feedback information including the related picture and the type information of the obstacle contained in the picture, which specifically includes: providing the interactive interface to allow the user to submit the feedback information, the feedback information including at least one picture shot this time and the type information of the obstacle.

Optionally, sending the feedback information to the server specifically includes: sending the feedback information to the server in an anonymous manner.

An embodiment of the present disclosure provides an obstacle recognition information feedback method. The method is applied to an autonomous robot, and includes: receiving a feedback information instruction from a terminal; and sending feedback information to a server, wherein the feedback information includes a related picture and type information of an obstacle contained in the picture.

Optionally, prior to receiving the feedback information instruction from the terminal, the following steps are further included: receiving a viewing touch instruction from the user, the viewing touch instruction including a request to view an obstacle type and a picture marked under a current obstacle type identification; and sending the obstacle type and the picture as marked to a client in response to the viewing touch instruction.

Optionally, sending the obstacle type and the picture as marked to the client includes: performing a de-identification process on the picture; and sending the marked obstacle type and the de-identified picture to the client.

Optionally, the following steps are further included: upon reception of a shooting instruction from the user, controlling the autonomous robot to perform shooting for the obstacle from at least one angle; sending a picture of the obstacle shot this time to the client; and upon reception of a confirmation instruction from the user, sending the picture of the obstacle shot this time to the server.

Optionally, upon the reception of the confirmation instruction from the user, sending the picture of the obstacle shot this time to the server includes: upon the reception of the confirmation instruction from the user, performing a de-identification process on the shot picture; and sending the de-identified picture to the server.

Optionally, the de-identification process includes: performing a de-identification process on a file identification of the picture and/or content of the picture.

Optionally, performing the de-identification process on the file identification of the picture includes: acquiring the file identification of the picture, the file identification of the picture including a file name, a file attribute or a device identification; and totally or partially deleting the file identification of the picture.

Optionally, performing the de-identification process on the content of the picture includes: recognizing content information of the picture, the content information of the picture including human body feature information or geographic position information; and totally or partially deleting the content information of the picture, or performing a fuzzification process on the content information of the picture.

Optionally, prior to receiving the feedback information instruction from the terminal, the following steps are further included: recognizing a type of the obstacle and marking a probability of the type to which the obstacle belongs; and when the probability is lower than a preset threshold, sending prompt information to a client for submitting feedback information.

An embodiment of the present disclosure provides an obstacle recognition information feedback apparatus. The apparatus includes: a displaying unit, configured to provide an interactive interface, upon reception of a triggered feedback instruction, to allow a user to submit feedback information, the feedback information including a related picture and type information of an obstacle contained in the picture; and a sending unit, configured to, after learning that submission by the user is completed, send the feedback information to a server, or notify a bound autonomous robot to send the feedback information to the server.

Optionally, the displaying unit is further configured to receive a viewing touch instruction from the user based on an obstacle type identification displayed in an application program interface, wherein the obstacle type identification is used to indicate a type of a pre-marked obstacle.

Optionally, the obstacle type identification includes an icon and/or a text description matching the type of the pre-marked obstacle.

Optionally, the sending unit is further configured to: display a de-identified preview picture sent by the autonomous robot; and upon reception of a triggered upload instruction, send the preview picture and the type information of the obstacle contained in the picture to the server, or notify the bound autonomous robot to send the preview picture and the type information of the obstacle contained in the picture to the server.

Optionally, the sending unit is further configured to: control the autonomous robot to perform shooting for the obstacle from at least one angle based on a shooting instruction issued by the user; display a picture shot this time; and provide the interactive interface to allow the user to submit feedback information, the feedback information including at least one picture shot this time and the type information of the obstacle.

Optionally, the sending unit is further configured to send the feedback information to the server in an anonymous manner.

An embodiment of the present disclosure provides an obstacle recognition information feedback apparatus. The apparatus is applied to an autonomous robot, and includes: a receiving unit, configured to receive a feedback information instruction from a terminal; and a sending unit, configured to send feedback information to a server, wherein the feedback information includes a related picture and type information of an obstacle contained in the picture.

Optionally, the receiving unit is further configured to: receive a viewing touch instruction from the user, the viewing touch instruction including a request to view an obstacle type and a picture marked under a current obstacle type identification; and send the obstacle type and the picture as marked to a client in response to the viewing touch instruction.

Optionally, the sending unit is further configured to: perform a de-identification process on the picture; and send the marked obstacle type and the de-identified picture to the client.

Optionally, the receiving unit is further configured to: upon reception of a shooting instruction from the user, control the autonomous robot to perform shooting for the obstacle from at least one angle; send a picture of the obstacle shot this time to the client; and upon reception of a confirmation instruction from the user, send the picture of the obstacle shot this time to the server.

Optionally, the receiving unit is further configured to: upon the reception of the confirmation instruction from the user, perform a de-identification process on the shot picture; and send the de-identified picture to the server.

Optionally, the de-identification process includes: performing a de-identification process on a file identification of the picture and/or content of the picture.

Optionally, performing the de-identification process on the file identification of the picture includes: acquiring the file identification of the picture, the file identification of the picture including a file name, a file attribute or a device identification; and totally or partially deleting the file identification of the picture.

Optionally, performing the de-identification process on the content of the picture includes: recognizing content information of the picture, the content information of the picture including human body feature information or geographic position information; and totally or partially deleting the content information of the picture, or performing a fuzzification process on the content information of the picture.

Optionally, the receiving unit is further configured to: recognize a type of the obstacle and mark a probability of the type to which the obstacle belongs; and when the probability is lower than a preset threshold, send prompt information to a client for submitting feedback information.

An embodiment of the present disclosure provides an autonomous robot including a processor and a memory, wherein the memory stores computer program instructions executable by the processor, and the computer program instructions, when executed by the processor, cause the processor to implement any of the above method steps.

An embodiment of the present disclosure provides a non-transitory computer-readable storage medium storing computer program instructions, wherein the computer program instructions, when called and executed by a processor, cause the processor to implement any of the above method steps.

BRIEF DESCRIPTION OF THE DRAWINGS

In order to describe the technical solutions in the embodiments of the present disclosure or in the relevant art more clearly, the accompanying drawings required in the descriptions of the embodiments or the relevant art will be briefly introduced below. Apparently, the accompanying drawings in the following descriptions show merely some embodiments of the present disclosure, and other drawings may also be obtained by those of ordinary skills in the art based on these drawings without creative work.

DETAILED DESCRIPTION

To make the objectives, technical solutions and advantages of the embodiments of the present disclosure clearer, the technical solutions in the embodiments of the present disclosure will be described clearly and fully below with reference to the accompanying drawings in the embodiments of the present disclosure. Apparently, the described embodiments are merely a part of embodiments of the present disclosure, not all embodiments of the present disclosure. All other embodiments achieved by those of ordinary skills in the art based on the embodiments of the present disclosure without creative work shall fall within the protection scope of the present disclosure.

Figure 1:
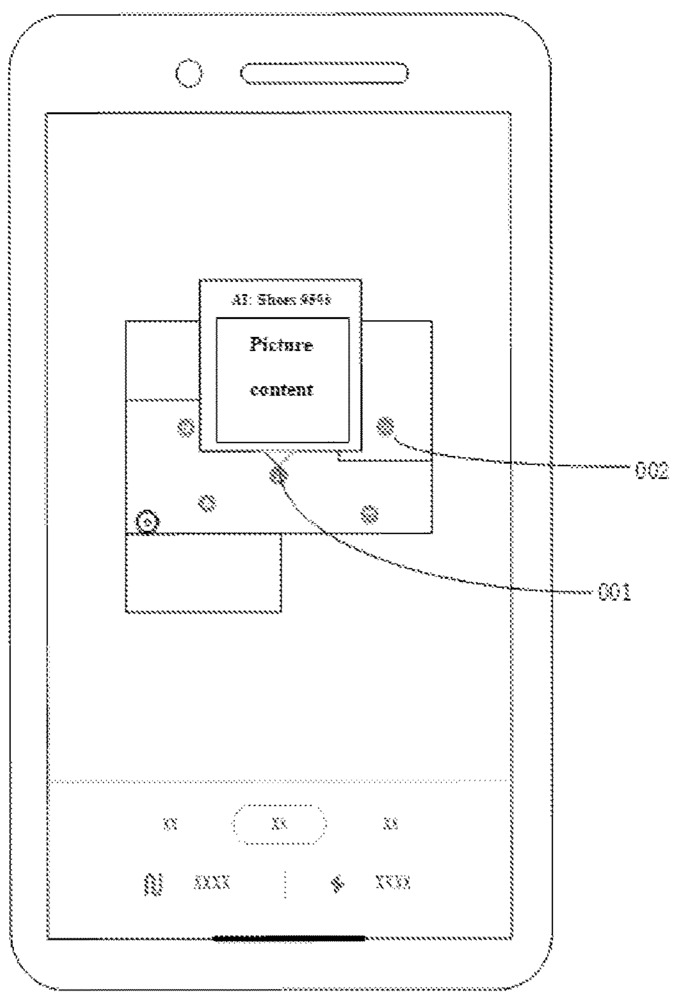
FIG. 1 is a schematic diagram of APP control according to an embodiment of the present disclosure.

An embodiment of the present disclosure provides a possible application scenario, in which an automatic cleaning apparatus recognizes an obstacle. For example, an autonomous robot, a ground mopping robot, a vacuum cleaner or a weeding machine recognizes, stores and displays the obstacle during operation, and so on. In an embodiment, as shown in FIG. 1, a household autonomous robot is taken as an example for illustration. During operation, the autonomous robot acquires a front view-field image in real time from an image acquisition apparatus at a front end of the autonomous robot, determines the presence of an obstacle according to an analysis of the view-field image, then determines a type of the obstacle if the obstacle presents, and marks the type of the obstacle in an APP of a mobile phone terminal. The user may click the APP to view the type of the obstacle. In an embodiment, the robot may be provided with one or more image acquisition apparatuses to acquire images in a travelling path, and the robot may also be provided with a touch display or controlled by a mobile terminal to receive operation instructions input by the user. The autonomous robot may also be provided with various sensors, such as a buffer, a cliff sensor, an ultrasonic sensor, an infrared sensor, a magnetometer, an accelerometer, a gyroscope, an odograph, and the like. The autonomous robot may also be provided with a wireless communication module, such as a WIFI module and a Bluetooth module, so as to be connected with an intelligent terminal or a server, and the autonomous robot may receive operation instructions transmitted by the intelligent terminal or the server through the wireless communication module.

Figure 2:
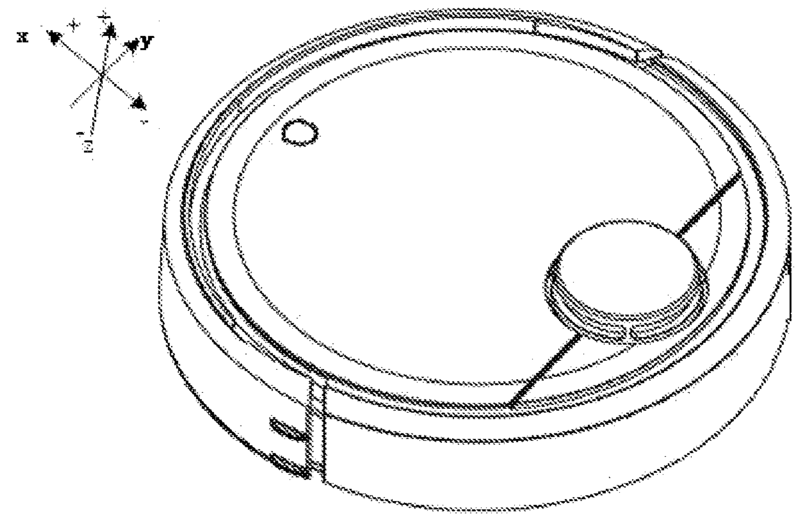
FIG. 2 is a perspective view of a structure of an autonomous robot according to an embodiment of the present disclosure.

As shown in FIG. 2, an automatic cleaning apparatus 100 may travel on a ground through various combinations of movements relative to the following three mutually perpendicular axes, i.e., a front and rear axis X, a transversal axis Y, and a center vertical axis Z, defined by a main body 110. A forward driving direction along the front and rear axis X is designated as "forward", and a rearward driving direction along the front and rear axis X is designated as "rearward". A direction of the transversal axis Y is actually along a direction of an axis center defined by a center point of a driving wheel module 141 extending between a right wheel and a left wheel of the robot.

The automatic cleaning apparatus 100 may rotate around the Y axis. It is called as "pitch up" when the forward portion of the automatic cleaning apparatus 100 is tilted upward and the rearward portion thereof is tilted downward, and it is called as "pitch down" when the forward portion of the automatic cleaning apparatus 100 is tilted downward and the rearward portion thereof is tilted upward. In addition, the robot 100 may rotate around the Z axis. In a forward direction of the automatic cleaning apparatus 100, it is called as "turn right" when the automatic cleaning apparatus 100 is tilted to the right of the X axis, and it is called as "turn left" when the automatic cleaning apparatus 100 is tilted to the left of the X axis.

Figure 3:
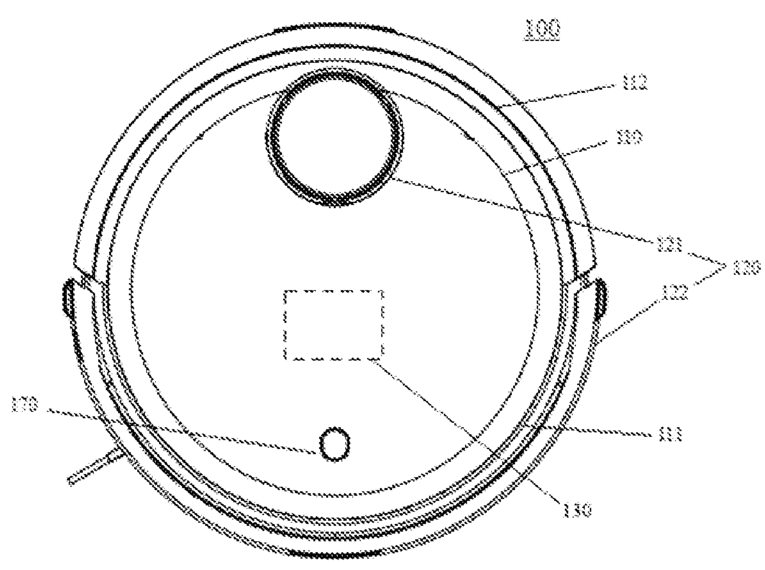
FIG. 3 is a top view of a structure of an autonomous robot according to an embodiment of the present disclosure.

As shown in FIG. 3, the automatic cleaning apparatus 100 includes an apparatus body 110, a perception system 120, a control system, a driving system 140, a cleaning system, an energy system, and a human-computer interaction system 180.

The apparatus body 110 includes a forward portion 111 and a rearward portion 112, and has an approximately circular shape (front and rear views are both circular) or other shapes, including, but not limited to, an approximate D shape with rectangular front view and circular rear view, and a rectangular or square shape with rectangular front view and rectangular rear view.

As shown in FIG. 3, the perception system 120 includes a position determination device 121 located on the apparatus body 110, a collision sensor and a proximity sensor that are disposed on a buffer 122 in the forward portion 111 of the apparatus body 110, a cliff sensor disposed in a lower portion of the apparatus body, and sensing devices such as a magnetometer, an accelerometer, a gyroscope (gyro) and an odograph (ODO) that are disposed inside the apparatus body, for providing various position information and motion state information of the automatic cleaning apparatus to the control system 130. The position determination device 121 includes, but is not limited to, a camera and a Laser Distance Sensor (LDS).

As shown in FIG. 3, the forward portion 111 of the apparatus body 110 may carry the buffer 122. During cleaning, when the driving wheel module 141 propels the robot to travel on the ground, the buffer 122 detects one or more events in a traveling path of the automatic cleaning apparatus 100 via a sensor system, e.g., an infrared sensor disposed thereon, and the automatic cleaning apparatus 100 may control the driving wheel module 141 based on the events such as obstacles and walls detected by the buffer 122 to cause the automatic cleaning apparatus 100 to respond to the events, for example, to move away from the obstacles.

The control system 130 is disposed on a main circuit board in the apparatus body 110, and includes a computing processor such as a central processing unit and an application processor that communicates with a non-transitory memory such as a hard disk, a flash memory and a random-access memory. The application processor is configured to generate a real-time map of an environment where the robot is located using a positioning algorithm, e.g., simultaneous localization and mapping (SLAM), based on obstacle information fed back by the LDS. Further, the control system 130 may, in combination with distance information and speed information fed back by the sensors or sensing devices disposed on the buffer 122 such as the cliff sensor, the magnetometer, the accelerometer, the gyroscope, the odograph and the like, comprehensively determine a current operation state and a current position of the autonomous robot, and a current posture of the autonomous robot, such as crossing a threshold, getting on a carpet, locating at an edge of a cliff, being stuck from above or below, having a full dust box, being picked up, etc., and will also give specific strategies about the next-step action for different situations, so that the operation of the robot is more in line with requirements of an owner and a better user experience is provided.

Figure 4:
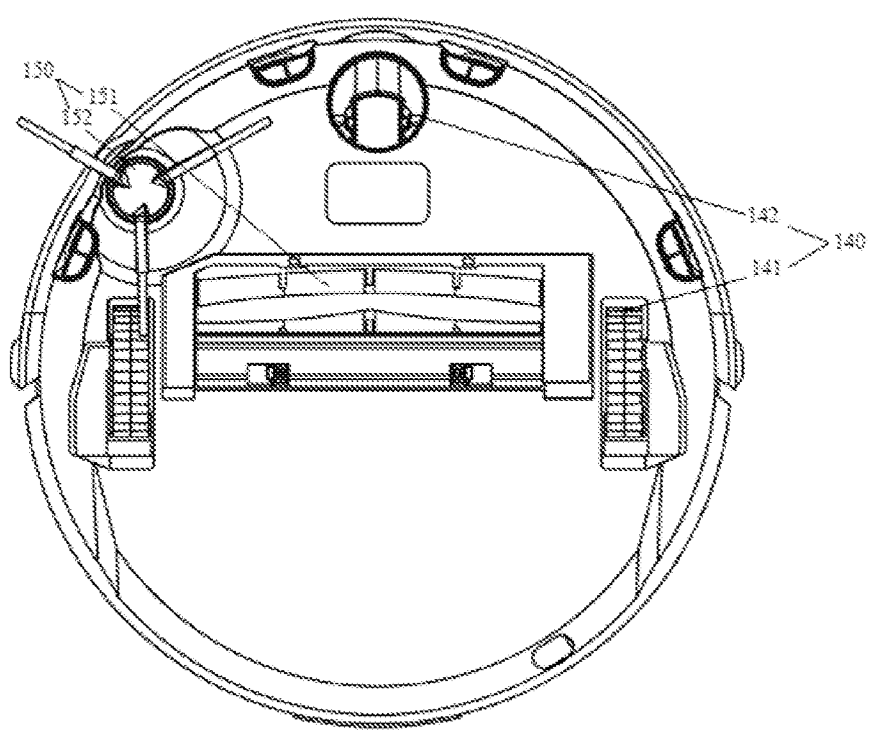
FIG. 4 is a bottom view of a structure of an autonomous robot according to an embodiment of the present disclosure.

As shown in FIG. 4, the driving system 140 may manipulate the robot 100 to travel across the ground based on driving commands with distance and angle information (such as x, y, and θcomponents). The driving system 140 includes the driving wheel module 141 that may control a left wheel and a right wheel simultaneously. In order to control the motion of the automatic cleaning apparatus more precisely, the driving wheel module 141 preferably includes a left driving wheel module and a right driving wheel module, respectively. The left driving wheel module and the right driving wheel module are disposed opposite to each other along a transversal axis defined by the apparatus body 110. In order for the robot to move on the ground more stably or have a stronger movement ability, the robot may include one or more driven wheels 142 including but not limited to a universal wheel. The driving wheel module includes a travelling wheel, a driving motor, and a control circuit for controlling the driving motor. The driving wheel module may also be connected with a circuit for measuring a driving current and the odograph. The driving wheel module 141 may be detachably connected to the apparatus body 110 to facilitate assembly, disassembly, and maintenance. The driving wheel may have an offset drop suspension system, which is movably fastened, e.g., rotatably attached, to the robot body 110, and receives a spring offset that is offset downward and away from the robot body 110. The spring offset allows the driving wheel to maintain contact and traction with the ground with a certain grounding force, and meanwhile, a cleaning element of the automatic cleaning apparatus 100 is also in contact with the ground 10 with a certain pressure.

The cleaning system may be a dry cleaning system and/or a wet cleaning system. Main cleaning functions of the dry cleaning system come from the cleaning system 151 formed by a rolling brush, a dust box, a blower, an air outlet and connection components between the four. The rolling brush having a certain interference with the ground sweeps up garbage on the ground, and rolls up the garbage to the front of a dust suction inlet between the rolling brush and the dust box. Then, the garbage is sucked into the dust box by air having a suction force, which is generated by the blower and passes through the dust box. The dry cleaning system may further include a side brush 152 having a rotary shaft with a certain angle relative to the ground, for moving debris into a region of the rolling brush of the cleaning system.

The energy system includes a rechargeable battery, such as a nickel-hydride battery and a lithium battery. The rechargeable battery may be connected with a charging control circuit, a battery pack charging temperature detection circuit, and a battery undervoltage monitoring circuit. The charging control circuit, the battery pack charging temperature detection circuit, and the battery undervoltage monitoring circuit are then connected to a single-chip microcomputer control circuit. A host of the robot is connected to a charging pile through a charging electrode disposed on a side or below a body of the robot for charging. If there is dust on the bare charging electrode, a plastic body around the electrode will be melted and deformed due to a charge accumulative effect in the charging process, even resulting in that the electrode itself is deformed and cannot continue normal charging.

The human-computer interaction system 180 includes buttons that are on a panel of the host and used by a user to select functions. The human-computer interaction system 180 may further include a display screen and/or an indicator light and/or a horn that present to the user a current state or function item of the robot. The human-computer interaction system 180 may further include a mobile client program. For a route navigation type of automatic cleaning apparatus, a mobile client may present to the user a map of the environment where the apparatus is located and a position of the apparatus, which may provide richer and more user-friendly function items to the user.

An embodiment of the present disclosure provides an obstacle recognition information feedback method. The method is applied to the autonomous robot or terminal described above, and includes: acquiring a front image from an image acquisition apparatus disposed on a body of the autonomous robot, recognizing a type of a related obstacle based on the image, and performing type correction with a mobile phone terminal.

Figure 5:
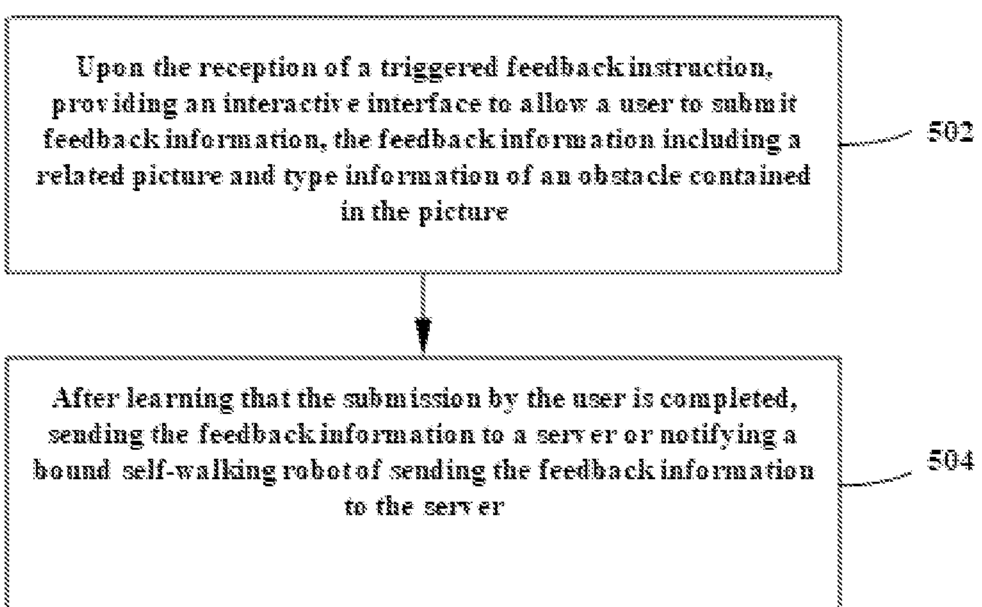
FIG. 5 is a schematic flowchart of a feedback method according to an embodiment of the present disclosure.

The method steps as shown in FIG. 5 are applied to a terminal device, and the terminal device includes, but is not limited to, an intelligent device such as a mobile phone, a PAD, and a computer. Specifically, the following method steps are included, and sequence numbers thereof do not necessarily have a sequential order.

Step S502, upon reception of a triggered feedback instruction, an interactive interface is provided to allow a user to submit feedback information, the feedback information including a related picture and type information of an obstacle contained in the picture.

Figure 6:
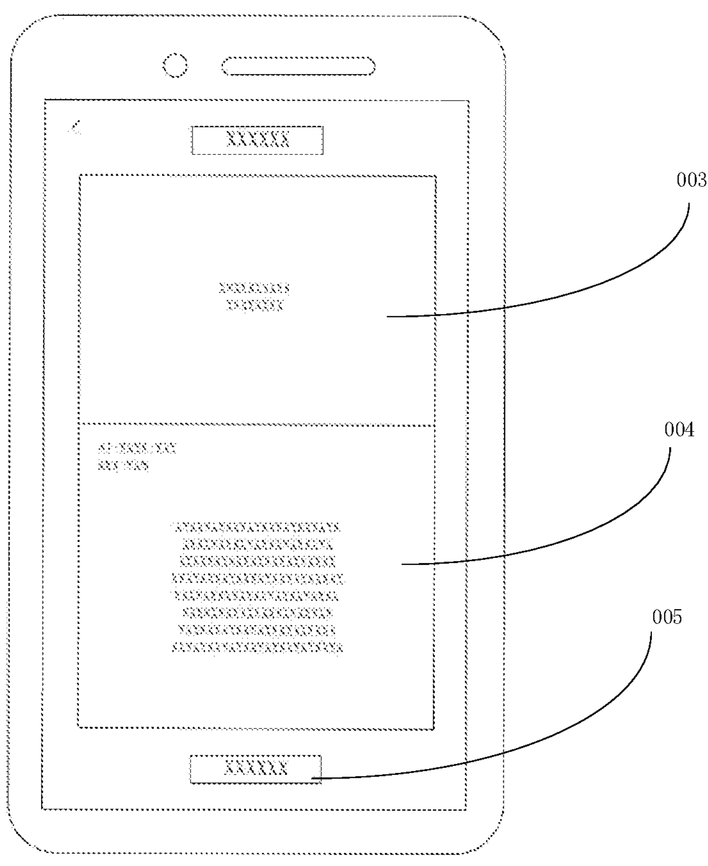
FIG. 6 is a schematic diagram of APP control according to an embodiment of the present disclosure.

As shown in FIG. 6, upon the reception of the feedback instruction sent from the user, the APP interactive interface is provided to allow the user to submit feedback information. A region 003 represents a picture including an obstacle image, and a region 004 represents type information of the recognized obstacle in the picture of the above region 003. The type information includes a percentage of being recognized as a particular type of obstacles. For example, the type of the obstacle recognized from the picture of the region 003 is shoes, and the probability of being shoes is 90%. A region 005 represents an operation control for confirmation or cancellation. When the user confirms that the type recognized by the robot is accurate through manual viewing, the user may click a confirmation button. Otherwise, the user may click a feedback button for the inaccuracy type feedback.

As an optional embodiment, prior to the step S502, the following step may be further included: receiving a viewing touch instruction from the user based on an obstacle type identification displayed in the application program interface, wherein the obstacle type identification is used to indicate the type to which a pre-marked obstacle belongs. The obstacle type identification includes an icon and/or a text description matching the type of the pre-marked obstacle.

Specifically, for example, referring to FIG. 1, after the user opens a control application program of the robot, a current map as well as a position and a type of an obstacle marked on the map are displayed in the APP interface. The position and the type of the obstacle are pre-marked by the robot during the previous operation. The marking method includes, but is not limited to, performing intelligent determination on object/scenario through a camera of the ground sweeping robot, and performing determination based on a deep neural network model trained with a large amount of labeled data. After labeling, for example, an icon 001 represents shoes, an icon 002 represents socks, and the like. After the user clicks each icon, the type and the percentage of recognition of the obstacle which is represented by the icon will pop up, and the picture of the corresponding obstacle will be displayed.

A specific labeling process includes, but is not limited to the following method. When the robot passes the obstacle and the probability of recognizing it as shoes from a first angle is 80%, under the icon 001, the recognized type is identified as shoes, the percentage is 80%, and the picture at the first angle is stored. When the robot passes the obstacle next time and the probability of recognizing it as shoes from a second angle is 90%, the recognized type identified under the icon 001 is updated as shoes, the percentage is 90%, and the picture at the second angle is stored. When the robot passes the obstacle for the third time and the probability of recognizing it as shoes from a third angle is 85%, the recognized type identified, the percentage, and the picture under the icon 001 are not updated. If the robot passes the obstacle again and the probability of recognizing it as socks from a fourth angle is 95%, the recognized type identified under the icon 001 is updated as socks, the percentage is 95%, and the picture at the fourth angle is stored. Meanwhile, the icon 001 of shoes is updated to be an icon 002 of socks.

Sep S504, after learning that submission by the user is completed, the feedback information is sent to a server through the terminal, or a bound autonomous robot is notified to send the feedback information to the server.

Upon reception of a instruction requiring feedback and submitted by the user, the terminal APP directly sends the feedback information to the server or notifies the bound autonomous robot to send the feedback information to the server. The feedback information sent to the server will be collected into a picture training set by the server, so as to increase the accuracy of subsequent recognition and determination of the robot. Specifically, the following method steps are included.

Step S504-1, a preview picture for the picture after a de-identification process is displayed, wherein the de-identification process includes: performing a de-identification process on the file identification and/or content of the picture.

Prior to sending the feedback instruction, the user requires to de-identify the current picture that needs to be fed back. The de-identification process may be performed on the robot or the terminal, which is not limited herein.

Specifically, a device for performing the de-identification process performs the following method:

- acquiring a file identification of the picture, the file identification of the picture including a file name, a file attribute or a device identification; and totally or partially deleting the file identification of the picture; and/or
- recognizing content information of the picture, the content information of the picture including human body feature information or geographic position information; and totally or partially deleting the content information of the picture.

The de-identified picture is sent to a client for the user to view and confirm, for example, confirm whether to perform deletion or mosaic processing for private information.

Step S504-3, upon reception of an upload confirmation instruction from the user, the de-identified picture and the type information of the obstacle contained in the picture are sent to the server through the terminal, or the bound autonomous robot is notified to send the de-identified picture and the type information of the obstacle contained in the picture to the server.

In this step, after the user clicks the interface to confirm the upload instruction, the de-identified picture and the type information of the obstacle contained in the picture are sent to the server through the terminal, or the bound autonomous robot is notified to send the de-identified picture and the type information of the obstacle contained in the picture to the server. This step does not change the current obstacle recognition result of the robot, but only provides a manual recognition feedback channel to enrich data in the training set of the server for comparison and determination in the subsequent recognition and determination process.

As an optional embodiment, the method further includes the following method step S506 (not shown). The step S506 is used to perform shooting for the obstacle from different angles and upload pictures from a plurality of angles, so as to enrich the training set of the server. Specifically, the following steps are included.

Step S506-1, the autonomous robot is controlled to perform shooting for the obstacle from at least one angle based on a shooting instruction issued by the user.

Step S506-2, a picture shot this time is displayed.

Step S506-3, the interactive interface is provided to allow the user to submit feedback information, the feedback information including the related picture and the type information of the obstacle contained in the picture. This specifically includes: providing the interactive interface to allow the user to submit the feedback information, the feedback information including at least one picture shot this time and the type information of the obstacle.

Specifically, the user selects a function button of "providing a picture from the viewing angle of the ground sweeping robot" in an APP page of the terminal device and enters a page for submitting the picture. Then, the APP notifies the device to open a camera and enable a real-time monitoring function through an internet of things (IoT) network. In this page, a video stream being shot by the camera on the ground sweeping robot may be displayed to the user in real time. The user may manually place or remotely control the ground sweeping robot to be at an appropriate position in a scenario requiring shooting for accomplishing shooting, and preview the picture in the APP page in real time. When observing the picture to be submitted, the user performs shooting through a save button on the page. After the shooting is completed, the user may submit the picture through a function of "submitting pictures" and upload the picture to the server.

As an optional embodiment, upon reception of a confirmation instruction from the user, the shot picture and the type information of the obstacle contained in the picture are sent to the server through the terminal, or the bound autonomous robot is notified to send the shot picture and the type information of the obstacle contained in the picture to the server. This includes the following contents.

Upon the reception of the confirmation instruction from the user, a de-identified preview picture of the shot picture is displayed. Upon the reception of the confirmation instruction from the user again, the de-identified picture and the type information of the obstacle contained in the picture are sent to the server through the terminal or, the bound autonomous robot is notified to send the de-identified picture and the type information of the obstacle contained in the picture to the server.

Prior to sending the feedback instruction, the user needs to perform a de-identification process on the current picture that requires feedback, and the de-identification process is performed at the robot. The de-identified picture is sent to a client for the user to view and confirm, for example, confirm whether to perform deletion or mosaic processing for private information. Specifically, a device for performing the de-identification process performs the following method steps:

acquiring a file identification of the picture, the file identification of the picture including a file name, a file attribute or a device identification, and totally or partially deleting the file identification of the picture; and/or recognizing content information of the picture, the content information of the picture including human body feature information or geographic position information, and totally or partially deleting the content information of the picture.

An embodiment of the present disclosure provides an obstacle recognition information feedback method. With the real-time communication between the terminal APP and the ground sweeping robot, the user may make a secondary determination about an obstacle recognition status from the viewing angle of the ground sweeping robot. When it is determined that the type of the obstacle and the shot picture are inaccurate, a correction operation is started to improve an obstacle recognition ability of the ground sweeping robot. In addition, the picture shot by the ground sweeping robot is de-identified and then uploaded to an image recognition training set, thereby improving the obstacle recognition ability of the ground sweeping robot.

Figure 7:
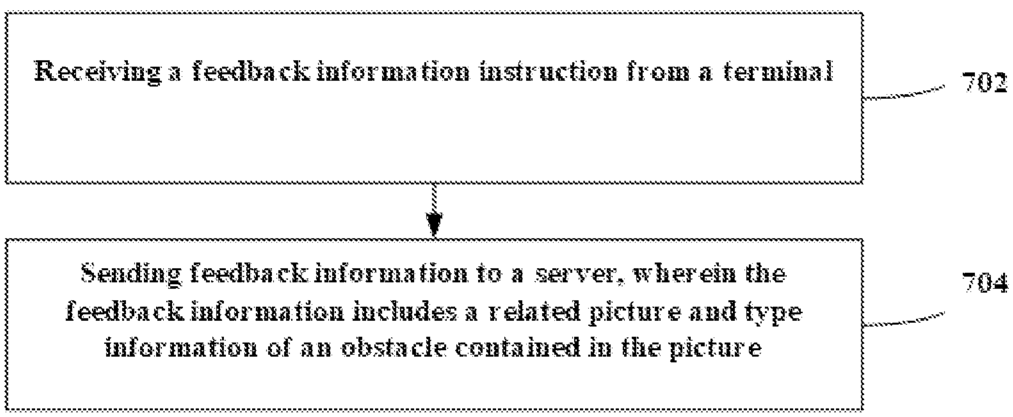
FIG. 7 is a schematic flowchart of a feedback method according to another embodiment of the present disclosure.

An embodiment of the present disclosure provides an obstacle recognition information feedback method. The method is applied to the autonomous robot described above. The method steps of this embodiment may be performed in cooperation with the above described embodiment, or may be performed separately. As shown in FIG. 7, the following method steps are included, and sequence numbers thereof do not necessarily have a sequential order.

Step S702, a feedback information instruction is received from a terminal.

Step S704, feedback information is sent to a server, wherein the feedback information includes a related picture and type information of an obstacle contained in the picture.

Viewing, recognition and feedback interfaces of the user are described in the above embodiment, and will not be repeated herein. When the user clicks a feedback instruction on the APP interactive interface, the autonomous robot receives the synchronous feedback information instruction, and sends the related picture and the type information of the obstacle contained in the picture to the server based on the instruction.

As an optional embodiment, prior to the step S702, the following step may be further included:

receiving a viewing touch instruction from the user, wherein the viewing touch instruction includes a request to view an obstacle type and a picture marked under a current obstacle icon; and sending the obstacle type and the picture as marked to a client in response to the viewing touch instruction.

Specifically, for example, referring to FIG. 1, after the user opens a control application program of the robot, a current map as well as a position and a type of an obstacle marked on the map are displayed in the APP interface. The position and the type of the obstacle are pre-marked by the robot during the previous operation. The marking method is described in the above embodiment, and will not be repeated herein. After labeling, when the user clicks each icon, a request to display the type of the obstacle and a percentage of recognition represented by the icon is sent to the robot, and the robot sends the type and the picture of the marked obstacle to the client upon reception of the request instruction.

As an optional embodiment, sending the obstacle type and the picture as marked to the client includes: performing a de-identification process on the picture; and sending the marked obstacle type and the de-identified picture to the client.

In an autonomous shooting process of the ground sweeping robot, private information of the user including a portrait of the user, a home address, and the like may be shot while shooting the obstacle, which private information is inappropriate to be uploaded to the server. Thus, in a process of uploading the relevant information, a de-identification process is required. The de-identification process includes: performing a de-identification process on a file identification of the picture and/or content of the picture. Through the de-identification process, the private information is deleted or mosaic processing is performed for the private information. Specifically, a device for performing the de-identification process performs the following method steps:

acquiring a file identification of the picture, the file identification of the picture including a file name, a file attribute or a device identification, and totally or partially deleting the file identification of the picture; and/or recognizing content information of the picture, the content information of the picture including human body feature information or geographic position information, and totally or partially deleting the content information of the picture.

Upon reception of a de-identification request submitted by the user, the autonomous robot invokes a picture de-identification flow including two aspects of de-identification on file identification and content of the picture. The de-identification on file identification refers to elimination of identifications of a relevant user and a device thereof in file name and file attribute. The de-identification on content refers to recognition of private and sensitive information such as human body information in the picture by use of an artificial intelligence (AI) algorithm and elimination of the private and sensitive information from the picture by use of an irreversible algorithm. The autonomous robot may encrypt and transmit the de-identified picture to the terminal APP for the user to view, confirm and submit. After the user confirms on the APP, a submission message is sent to the robot, and the robot performs an operation for submission to the server.

As an optional embodiment, the autonomous robot may also perform the following method steps: upon reception of a re-shooting instruction from the user, controlling the autonomous robot to perform shooting for the obstacle from a different angle; sending a shot picture of the obstacle to the client; and upon reception of a confirmation instruction from the user, sending the shot picture to the server.

The autonomous robot may walk around the obstacle and send pictures of the obstacle in the form of a video stream to the client, for selection by the user at the client. Upon reception of a shooting instruction from the user, the autonomous robot performs shooting for the obstacle at the current angle, and sends the shot pictures to a user APP. The shot pictures may be continuous for selection by the user, and the pictures shot at various angles may be sent to the training set of the server for a subsequent recognition application.

Upon the reception of the confirmation instruction from the user, it is required to perform a de-identification process on the shot picture prior to sending the shot picture to the server. The method steps for de-identification are described above, and will not be repeated herein.

As an optional embodiment, prior to receiving the feedback information instruction sent from the terminal, the following steps are further included: recognizing a type of the obstacle and marking a probability of the type to which the obstacle belongs; and when the probability is lower than a preset threshold, sending prompt information to a client for submitting feedback information.

During autonomous and travelling, the robot continuously recognizes the type of the obstacle and provides the probability of the type to which the current obstacle belongs based on a recognition model. For example, a probability of being recognized as shoes is 80%, a probability of being recognized as a ball is 90%, and the like. However, some obstacles are uneasy to recognize. For example, a probability of accurately recognizing an unshaped obstacle such as a paper ball and socks is low. That is, a probability of being recognized as socks is 20%, a probability of being recognized as a paper ball is 15%, and the like. When the probability is lower than the preset threshold, e.g., 50%, the robot may select to send prompt information about a low recognition probability to the terminal and request the user to perform operations such as active recognition, determination and picture uploading. Upon reception of the prompt information, the user may perform a feedback information operation as described above, which will not be repeated herein.

An embodiment of the present disclosure provides an obstacle recognition information feedback method. With the real-time communication between the terminal APP and the ground sweeping robot, the user may make a secondary determination about an obstacle recognition status from the viewing angle of the ground sweeping robot. When it is determined that the type of the obstacle and the shot picture are inaccurate, a correction operation is started to improve an obstacle recognition ability of the ground sweeping robot. In addition, the picture shot by the ground sweeping robot is de-identified and then uploaded to an image recognition training set, thereby improving the obstacle recognition ability of the ground sweeping robot.

Figure 8:
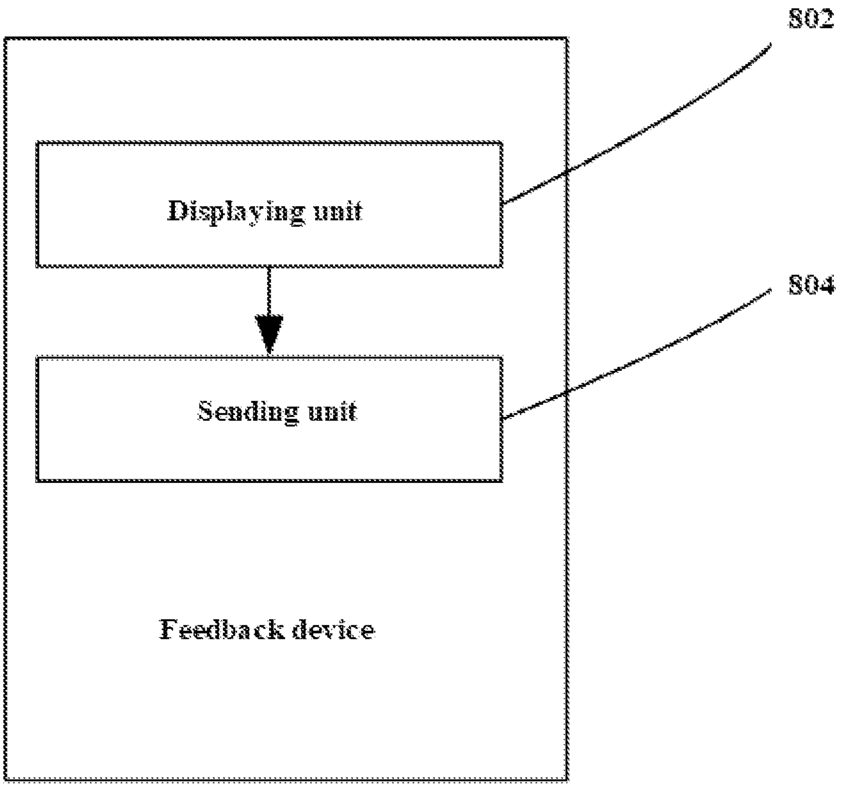
FIG. 8 is a structural block diagram of a feedback apparatus according to an embodiment of the present disclosure.

An embodiment of the present disclosure provides an obstacle recognition information feedback apparatus. The apparatus is applied to a terminal, and performs the method steps described in the above embodiment. Same method steps have same technical effects, which will not be repeated herein. As shown in FIG. 8, the obstacle recognition information feedback apparatus includes:

- a displaying unit 802, configured to provide an interactive interface, upon reception of a triggered feedback instruction, to allow a user to submit feedback information, wherein the feedback information includes a related picture and type information of an obstacle contained in the picture.

As an optional embodiment, a receiving unit (not shown) is further included. The receiving unit is configured to receive a viewing touch instruction from the user based on an obstacle icon in an application program interface, wherein the obstacle icon matches a type of a pre-marked obstacle.

The obstacle recognition information feedback apparatus further includes a sending unit 804, configured to, after learning that submission by the user is completed, send the feedback information to a server, or notify a bound autonomous robot to send the feedback information to the server.

The obstacle recognition information feedback apparatus further includes the following de-identifying sub-unit (not shown) configured to display a de-identified preview picture of the picture, wherein the de-identification process includes: performing a de-identification process on a file identification of the picture and/or content of the picture.

Specifically, a device for performing the de-identification process performs the following procedures: acquiring a file identification of the picture, the file identification of the picture including a file name, a file attribute or a device identification, and totally or partially deleting the file identification of the picture; and/or recognizing content information of the picture, the content information of the picture including human body feature information or geographic position information, and totally or partially deleting the content information of the picture.

As an optional embodiment, the obstacle recognition information feedback apparatus further includes the following re-shooting sub-unit (not shown) configured to perform shooting for an obstacle from different angles and upload pictures from a plurality of angles so as to enrich a training set of the server. Specifically, the following steps are included: controlling the autonomous robot to perform shooting for the obstacle from at least one angle based on a shooting instruction issued by the user; displaying a picture shot this time; and providing the interactive interface to allow the user to submit feedback information, the feedback information including the related picture and the type information of the obstacle contained in the picture, which specifically includes: providing the interactive interface to allow the user to submit feedback information, the feedback information including at least one picture shot this time and the type information of the obstacle.

As an optional embodiment, upon reception of a confirmation instruction from the user, sending the shot picture and the type information of the obstacle contained in the picture to the server through the terminal, or notifying the bound autonomous robot to send the shot picture and the type information of the obstacle contained in the picture to the server, includes: upon the reception of the confirmation instruction from the user, displaying a de-identified preview picture of the shot picture; and upon the reception of the confirmation instruction from the user again, sending the de-identified picture and the type information of the obstacle contained in the picture to the server through the terminal, or notifying the bound autonomous robot to send the de-identified picture and the type information of the obstacle contained in the picture to the server.

Prior to sending the feedback instruction, the user needs to perform a de-identification process on the current picture that requires feedback, and the de-identification process is performed at the robot. The de-identified picture is sent to a client for the user to view and confirm, for example, confirm whether to perform deletion or mosaic processing for private information. Specifically, a device for performing the de-identification process performs the following procedures:

acquiring a file identification of the picture, the file identification of the picture including a file name, a file attribute or a device identification, and totally or partially deleting the file identification of the picture; and/or recognizing content information of the picture, the content information of the picture including human body feature information or geographic position information, and totally or partially deleting the content information of the picture or performing a fuzzification process on the content information of the picture.

An embodiment of the present disclosure provides an obstacle recognition information feedback apparatus. With the real-time communication between the terminal APP and the ground sweeping robot, the user may make a secondary determination about an obstacle recognition status from the viewing angle of the ground sweeping robot. When it is determined that the type of the obstacle and the shot picture are inaccurate, a correction operation is started to improve an obstacle recognition ability of the ground sweeping robot. In addition, the picture shot by the ground sweeping robot is de-identified and then uploaded to an image recognition training set, thereby improving the obstacle recognition ability of the ground sweeping robot.

Figure 9:
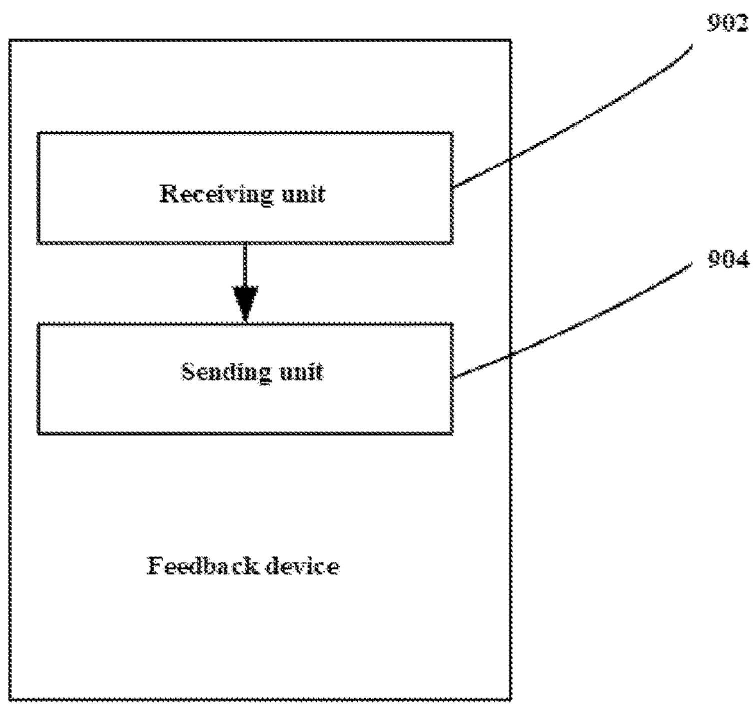
FIG. 9 is a structural block diagram of a feedback apparatus according to another embodiment of the present disclosure.

An embodiment of the present disclosure provides an obstacle recognition information feedback apparatus. The apparatus is applied to the autonomous robot described above, and performs the method steps described in the above embodiment. Same method steps have same technical effects, which will not be repeated herein. As shown in FIG. 9, the obstacle recognition information feedback apparatus includes:

a receiving unit 902, configured to receive a feedback information instruction from a terminal.

As an optional embodiment, the receiving unit 902 is further configured to: receive a viewing touch instruction from a user, wherein the viewing touch instruction includes a request to view an obstacle type and a picture marked under a current obstacle icon; and send the obstacle type and the picture as marked to a client in response to the viewing touch instruction.

The obstacle recognition information feedback apparatus further includes a sending unit 904 configured to send feedback information to the server, wherein the feedback information includes a related picture and type information of an obstacle contained in the picture.

As an optional embodiment, sending the obstacle type and the picture as marked to the client includes: performing a de-identification process on the picture; and sending the marked obstacle type and the de-identified picture to the client.

Specifically, a device for performing the de-identification process performs the following procedures: acquiring a file identification of the picture, the file identification of the picture including a file name, a file attribute or a device identification, and totally or partially deleting the file identification of the picture; and/or recognizing content information of the picture, the content information of the picture including human body feature information or geographic position information, and totally or partially deleting the content information of the picture.

As an optional embodiment, the obstacle recognition information feedback apparatus further includes a re-shooting unit, configured to: upon reception of a re-shooting instruction from the user, control the autonomous robot to perform shooting for the obstacle from a different angle; send a shot picture of the obstacle to the client; and upon reception of a confirmation instruction from the user, send the shot picture to the server.

As an optional embodiment, prior to receiving the feedback information instruction from the terminal, the following steps are further included: recognizing a type of the obstacle and marking a probability of the type to which the obstacle belongs; and when the probability is lower than a preset threshold, sending prompt information to a client for submitting feedback information.

An embodiment of the present disclosure provides an obstacle recognition information feedback apparatus. With the real-time communication between the terminal APP and the ground sweeping robot, the user may make a secondary determination about an obstacle recognition status from the viewing angle of the ground sweeping robot. When it is determined that the type of the obstacle and the shot picture are inaccurate, a correction operation is started to improve an obstacle recognition ability of the ground sweeping robot. In addition, the picture shot by the cleaning robot is de-identified and then uploaded to an image recognition training set, thereby improving the obstacle recognition ability of the ground sweeping robot.

An embodiment of the present disclosure provides a non-transitory computer-readable storage medium storing computer program instructions, wherein the computer program instructions, when called and executed by a processor, cause the processor to implement any of the above method steps.

An embodiment of the present disclosure provides a robot including a processor and a memory, wherein the memory stores computer program instructions executable by the processor, and the computer program instructions, when executed by the processor, cause the processor to implement any of the above method steps.

Figure 10:
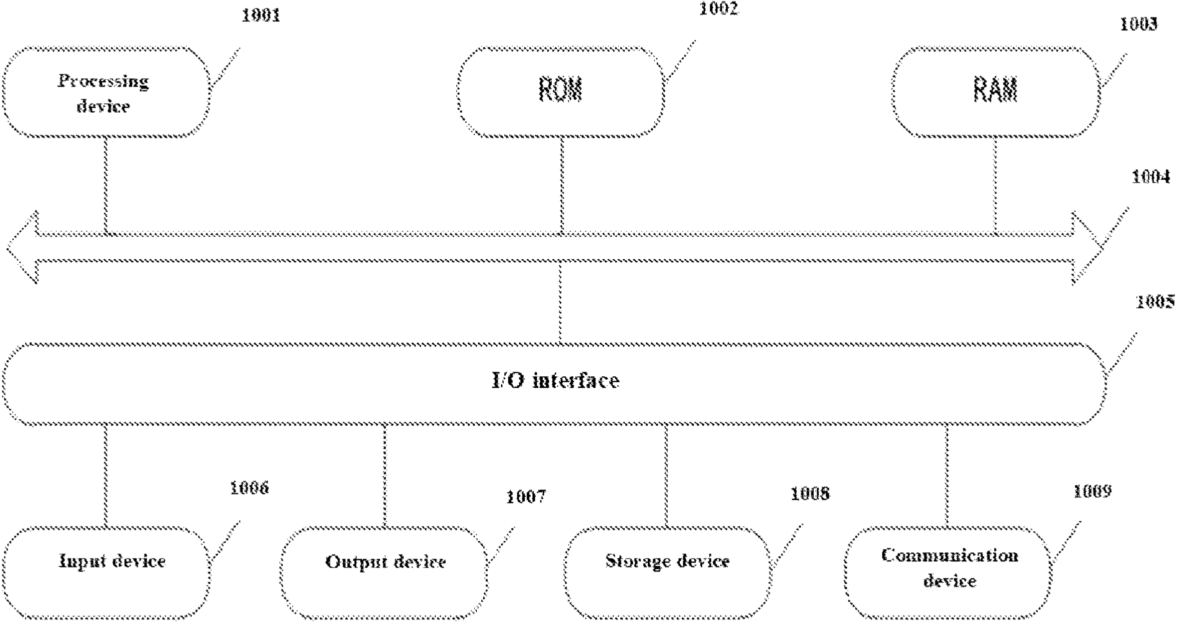
FIG. 10 is a schematic diagram of an electronic structure of a robot according to an embodiment of the present disclosure.

As shown in FIG. 10, the robot may include a processing device 1001 (such as a central processor and a graphic processor) that may perform various appropriate actions and processing according to a program stored in a read-only memory (ROM) 1002 or loaded from a storage device 1008 into a random-access memory (RAM) 1003. Various programs and data required for an operation of an electronic robot 1000 are also stored in the RAM 1003. The processing device 1001, the ROM 1002, and the RAM 1003 are connected to one another through a bus 1004. An input/output (I/O) interface 1005 is also connected to the bus 1004.

Generally, the following devices may be connected to the I/O interface 1005: an input device 1006 including a touch screen, a touch pad, a keyboard, a mouse, a camera, a microphone, an accelerometer and a gyroscope, for example; an output device 1007 including a liquid crystal display (LCD), a speaker and a vibrator, for example; a storage device 1008 including a hard disk, for example; and a communication device 1009. The communication device 1009 may allow the electronic robot to be in wireless or wired communication with other robots so as to exchange data. Although FIG. 10 illustrates the electronic robot with various devices, it should be understood that, not all of the illustrated devices are to be implemented or provided, and alternatively, more or fewer devices may be implemented or provided.

It is to be noted that, the above computer-readable medium of the present disclosure may be a computer-readable signal medium or a computer-readable storage medium or any combination of the above two. For example, the computer-readable storage medium may be, but is not limited to, an electronic, magnetic, optical, electromagnetic, infrared or semiconductor system, apparatus or device, or any combination of the foregoing. More specific examples of the computer-readable storage medium may include, but are not limited to, an electrical connection having one or more wires, a portable computer diskette, a hard disk, a random-access memory (RAM), a read-only memory (ROM), an erasable programmable read-only memory (EPROM or a flash memory), an optical fiber, a portable compact disc read-only memory (CD-ROM), an optical storage device, a magnetic storage device or any suitable combination of the foregoing. In the present disclosure, the computer-readable storage medium may be any tangible medium that contains or stores a program, and the program may be used by an instruction execution system, apparatus or device, or used in combination therewith. In the present disclosure, the computer-readable signal medium may include a data signal propagated in a baseband or as a part of a carrier wave with a computer-readable program code embodied therein. The propagated data signal may take a variety of forms, including but not limited to an electromagnetic signal, an optical signal or any suitable combination of the foregoing. The computer-readable signal medium may also be any computer-readable medium other than the computer-readable storage medium. The computer-readable signal medium may send, propagate or transmit a program for use by or use in combination with the instruction execution system, apparatus or device. The program code contained in the computer-readable medium may be transmitted using any appropriate medium, including but not limited to an electric wire, an optical cable, radio frequency (RF), or the like, or any suitable combination of the foregoing.

The above computer-readable medium may be contained in the above robot, or may exist alone without being assembled in the robot.

The flowcharts and block diagrams in the drawings illustrate system architectures, functions and operations that may be implemented based on systems, methods, and computer program products according to various embodiments of the present disclosure. In this regard, each block of the flowcharts or block diagrams may represent a module, a program segment, or a portion of code that includes one or more executable instructions for implementing the specified logic functions. It should also be noted that, in some alternative implementations, functions noted in the blocks may also occur in a sequence different from those illustrated in the drawings. For example, two consecutive blocks may be substantially executed in parallel, or may sometimes be executed in a reverse order, depending on the involved functions. It is also to be noted that each block of the block diagrams and/or flowcharts, and a combination of the blocks in the block diagrams and/or flowcharts may be implemented by a dedicated hardware-based system that performs the specified functions or operations, or may be implemented by a combination of dedicated hardware and computer instructions.

The apparatus embodiments described above are merely illustrative, wherein the units described as separate components may be or may not be physically separated, and the components displayed as units may be or may not be physical units, i.e., may be located at one place or may be distributed over a plurality of network units. The objectives of the solutions of the embodiments may be realized by selecting part or all of the modules according to actual requirements. The above descriptions can be understood and implemented by those of ordinary skills in the art without creative work.

Finally, it is to be noted that the above embodiments are merely used to illustrate the technical solutions of the present disclosure, rather than limit the technical solutions of the present disclosure. Although the present disclosure is described in detail with reference to the above embodiments, those of ordinary skills in the art should understand that, they can still make modifications to the technical solutions described in the above various embodiments or make equivalent substitutions to some of the technical features; and these modifications or substitutions do not make the essence of the corresponding technical solutions deviate from the spirit and scope of the technical solutions according to various embodiments of the present disclosure.

What is claimed is:

1. An obstacle recognition information feedback method, the method being applied to a terminal, and comprising:

receiving a viewing touch instruction from a user based on a map currently displayed in a first interface and a position and a type identification of an obstacle marked on the map, wherein the type identification is used to indicate a pre-marked type of the obstacle, and the pre-marked type is pre-marked by an autonomous robot during a previous operation;

upon reception of a triggered feedback instruction, providing a second interface different from the first interface to allow the user to submit feedback information, the feedback information comprising a related picture and type information of the obstacle contained in the picture, wherein the second interface comprises a feedback button, and the feedback button is clicked by the user for providing an inaccurate-type feedback when the user confirms that a type recognized by the autonomous robot is inaccurate; and after learning that submission by the user is completed, sending the feedback information to a server, or notifying the autonomous robot to send the feedback information to the server, wherein the sending the feedback information to the server, or the notifying the bound autonomous robot to send the feedback information to the server, comprises:

upon reception of a triggered upload instruction, sending a de-identified picture and the type information of the obstacle contained in the picture to the server, or notifying the bound autonomous robot to send the de-identified picture and the type information of the obstacle contained in the picture to the server, and wherein the de-identified picture is acquired by the autonomous robot through operations of:

recognizing content information of the picture, the content information of the picture comprising geographical location; and totally or partially deleting the content information of the picture or performing a fuzzification process on the content information of the picture.

2. The method according to claim 1, wherein the type identification comprises an icon and/or a text description matching the pre-marked type of the obstacle.

3. The method according to claim 1, wherein the sending the feedback information to the server, or the notifying the autonomous robot to send the feedback information to the server, further comprises:

displaying the de-identified preview picture sent by the autonomous robot.

4. The method according to claim 1, further comprising:

controlling the autonomous robot to perform shooting for the obstacle from at least one angle based on a shooting instruction issued by the user;

displaying a picture shot this time; and providing the second interface to allow the user to submit feedback information, the feedback information comprising the related picture and the type information of the obstacle contained in the picture, which specifically comprises: providing the second interface to allow the user to submit feedback information, the feedback information comprising at least one picture shot this time and the type information of the obstacle.

5. The method according to claim 1, wherein the sending the feedback information to the server, comprises: sending the feedback information to the server in an anonymous manner.

6. An obstacle recognition information feedback method, the method being applied to an autonomous robot, and comprising:

receiving a feedback information instruction from a terminal, wherein the feedback information instruction comprises an inaccurate-type instruction issued when a user confirms that a type recognized by the autonomous robot is inaccurate; and sending feedback information to a server, wherein the feedback information comprises a related picture and type information of an obstacle contained in the picture, and the feedback information is submitted by the user in a second interface of the terminal, wherein the method further comprises: prior to receiving the feedback information instruction from the terminal, receiving a viewing touch instruction from the user, the viewing touch instruction comprising a request to view an obstacle type and a picture marked under a current obstacle type identification, wherein the viewing touch instruction is issued based on a current map displayed in a first interface different from the second interface of the terminal and a position and a type identification of an obstacle marked on the map, and the pre-marked type is pre-marked by the autonomous robot during a previous operation; and sending the obstacle type and the picture as marked to the terminal in response to the viewing touch instruction, wherein the sending the obstacle type and the picture as marked to the terminal comprises:

performing a de-identification process on the picture, wherein the de-identification process comprises:

performing the de-identification process on content of the picture, and wherein the performing the de-identification process on the content of the picture comprises:

recognizing content information of the picture, the content information of the picture comprising geographical location; and totally or partially deleting the content information of the picture or performing a fuzzification process on the content information of the picture.

7. The method according to claim 6, wherein the sending the obstacle type and the picture as marked to the terminal further comprises:

sending the marked obstacle type and the de-identified picture to the terminal.

8. The method according to claim 6, further comprising:

upon reception of a shooting instruction from the user, controlling the autonomous robot to perform shooting for the obstacle from at least one angle;

sending a picture of the obstacle shot this time to the terminal; and upon reception of a confirmation instruction from the user, sending the picture of the obstacle shot this time to the server.

9. The method according to claim 8, wherein upon the reception of the confirmation instruction from the user, the sending the picture of the obstacle shot this time to the server comprises:

upon the reception of the confirmation instruction from the user, performing the de-identification process on the shot picture; and sending the de-identified picture to the server.

10. The method according to claim 7, wherein the de-identification process further comprises:

performing the de-identification process on a file identification of the picture.

11. The method according to claim 10, wherein the performing the de-identification process on the file identification of the picture comprises:

acquiring the file identification of the picture, the file identification of the picture comprising a file name, a file attribute or a device identification; and totally or partially deleting the file identification of the picture.

12. The method according to claim 6, further comprising: prior to receiving the feedback information instruction from the terminal, recognizing a type of the obstacle and marking a probability of the type to which the obstacle belongs; and when the probability is lower than a preset threshold, sending prompt information to the terminal for submitting the feedback information.

13. An autonomous robot comprising a processor and a memory, wherein the memory stores computer program instructions executable by the processor, and when the processor executes the computer program instructions, method steps according to claim 6 are implemented.

14. The method according to claim 10, wherein the performing the de-identification process on the content of the picture comprises:

recognizing content information of the picture, the content information of the picture comprising human body feature information; and totally or partially deleting the content information of the picture or performing a fuzzification process on the content information of the picture.

15. An autonomous robot comprising a processor and a memory, wherein the memory stores computer program instructions executable by the processor, and when the processor executes the computer program instructions, an obstacle recognition information feedback method is performed, the method comprising:

receiving a viewing touch instruction from a user based on a map currently displayed in a first interface and a position and a type identification of an obstacle marked on the map, wherein the type identification is used to indicate a pre-marked type of the obstacle, and the pre-marked type is pre-marked by the autonomous robot during a previous operation;

upon reception of a triggered feedback instruction, providing a second interface to allow the user to submit feedback information, the feedback information comprising a related picture and type information of the obstacle contained in the picture, wherein the second interface comprises a feedback button, and the feedback button is clicked by the user for providing an inaccurate-type feedback when the user confirms that a type recognized by the autonomous robot is inaccurate; and after learning that submission by the user is completed, sending the feedback information to a server, or notifying the autonomous robot to send the feedback information to the server, wherein the sending the feedback information to the server, or the notifying the bound autonomous robot to send the feedback information to the server, comprises:

upon reception of a triggered upload instruction, sending a de-identified picture and the type information of the obstacle contained in the picture to the server, or notifying the bound autonomous robot to send the de-identified picture and the type information of the obstacle contained in the picture to the server, and wherein the de-identified picture is acquired by the autonomous robot through operations of:

recognizing content information of the picture, the content information of the picture comprising geographical location; and totally or partially deleting the content information of the picture or performing a fuzzification process on the content information of the picture.

16. The autonomous robot according to claim 15, wherein the sending the feedback information to the server, or the notifying the autonomous robot to send the feedback information to the server, further comprises:

displaying a de-identified preview picture sent by the autonomous robot; and upon reception of a triggered upload instruction, sending the de-identified picture and the type information of the obstacle contained in the picture to the server, or notifying the autonomous robot to send the de-identified picture and the type information of the obstacle contained in the picture to the server.

17. The autonomous robot according to claim 15, wherein the method further comprises:

controlling the autonomous robot to perform shooting for the obstacle from at least one angle based on a shooting instruction issued by the user;

displaying a picture shot this time; and providing the second interface to allow the user to submit feedback information, the feedback information comprising the related picture and the type information of the obstacle contained in the picture, which specifically comprises: providing the second interface to allow the user to submit feedback information, the feedback information comprising at least one picture shot this time and the type information of the obstacle.

* * * * *